July 7, 1959 A. RYBA 2,893,528
FRICTION COUPLING
Filed Sept. 13, 1956 2 Sheets-Sheet 1

*INVENTOR.*
ANTON RYBA
BY
ATTORNEYS

July 7, 1959 A. RYBA 2,893,528
FRICTION COUPLING
Filed Sept. 13, 1956 2 Sheets-Sheet 2

INVENTOR.
ANTON RYBA
BY
ATTORNEYS

United States Patent Office 2,893,528
Patented July 7, 1959

2,893,528

FRICTION COUPLING

Anton Ryba, Bolzano, Italy, assignor of thirty percent to Joseph Reinisch and thirty percent to Ernst Vinatzer, both of Bolzano, Italy Application September 13, 1956, Serial No. 609,586

Claims priority, application Austria September 19, 1955

10 Claims. (Cl. 192—111)

The present invention relates to friction couplings or clutches, and more particularly to friction couplings in which the coupling action is effected by frictional engagement of two or more friction discs in response to a coupling pressure generated by any suitable force such as an electromagnetic force, mechanical pressure, or spring pressure.

As is well known, the coacting friction discs experience a certain wear and tear which necessitates a periodic resetting of the disc assembly. Such servicing of the coupling is inconvenient and costly. As a result, the field of application of friction couplings is rather limited.

One of the objects of the present invention is to provide a novel and improved friction coupling of the general kind above referred to, which will remain operative without periodic servicing.

Another object of the invention is to provide a novel and improved friction coupling in which the discs in the disc assembly are automatically re-set at the correct distance one from another.

Still another object of the invention is to provide a novel and improved friction coupling which includes means automatically compensating for the normal wear and tear experienced by the friction discs during the operation of the coupling.

Other and further objects, features and advantages of the invention will be pointed out hereinafter and set forth in the appended claims forming part of the application.

In the accompanying drawing several preferred embodiments of the invention are shown by way of illustration and not by way of limitation.

Figure 1:
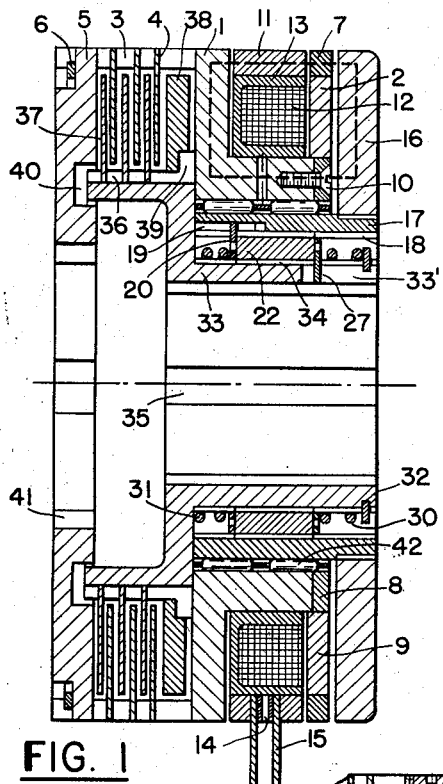
Fig. 1 is a sectional elevational view of an electromagnetically operated friction coupling according to the invention.

Referring first to Fig. 1 and the associated detail Figs. 5 through 10, the coupling of Fig. 1 is shown as comprising a magnet body composed of a rotary part and a stationary part. The rotary part comprises members 1 and 2, of which member 1 has secured thereto or integral therewith axially extending lugs 3 in which are fitted the outer friction discs 4 of the main friction assembly of the coupling. Lugs 3 are also secured to a coupling disc 5 which is adapted to receive one of the components to be coupled. Friction discs 4 and coupling disc 5 are secured to lugs 3 by means of a circlip 6.

Member 2 of the rotary part of the magnet body is formed by two radially spaced ferromagnetic rings 7 and 8 which are joined by means of a non-magnetic intermediate ring 9. The members 1 and 2 are secured to each other by any suitable means shown as circumferentially spaced screws 10.

The stationary part of the magnetic body is disposed within the space defined by rotary members 1 and 2 and is formed by a ring 11 and an exciting coil 12. Coil 12 is preferably embedded in a non-magnetic ring 13 of U-shaped cross-section.

One of the conductors for the coil is connected to mass and the other is connected to the coil through a bore 14. The stationary part of the magnet body is held in stationary position by any suitable means such as a tube 15.

Figure 9:
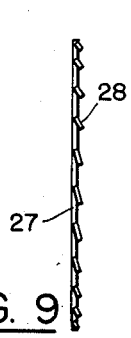
Fig. 9 is an edge view of Fig. 8.
Figure 10:
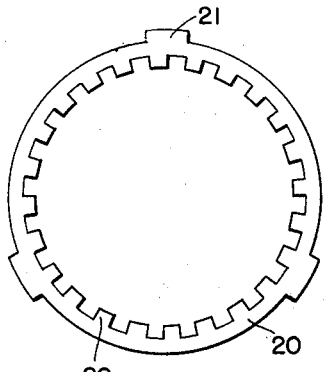
Fig. 10 is a plan view of still another component of the couplings according to Figs. 1 through 4.
Figure 8:
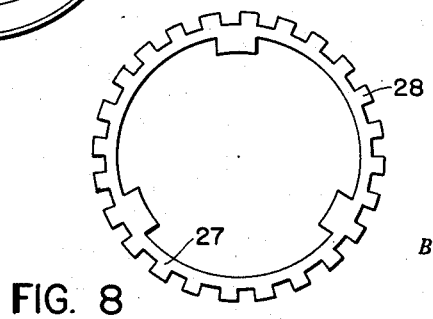
Fig. 8 is a plan view of another component of the friction couplings according to Figs. 1 through 4.

The magnetic part of the coupling is completed by an armature 16 which is fixedly secured to a ring sleeve 17. Sleeve 17 is formed with an internal thread 18 and notches 19 which are engaged by ears 21 of a lock ring 20 (see Fig. 10). Ring 20 coacts with a screw or threaded ring 22 (Fig. 5) which is provided on its cylindrical walls with external and internal threads 23 and 24 respectively. One of the threads is a right hand thread and the other a left hand thread. The two face sides of ring 22 bear slanted locking teeth 25 and 26 which may either be secured to ring 22 or be formed out of the material thereof. Teeth 25 and 26 are engaged respectively by teeth 29 of lock ring 20 or teeth 28 of a second lock ring 27. Lock ring 27 is shown in Figs. 8 and 9. As appears from a comparison of these figures with Fig. 10, the two lock rings are similar, but the positions of their teeth and the ears are reversed. Lock rings 20 and 27 may be stamped, pressed or punched from any suitable material. As can best be seen in Fig. 9 the teeth 28 (or 29) are preferably slightly slanted in the direction of the slant of locking teeth 25 and 26 of gear ring 22.

Springs 30 and 31 serve to press lock rings 20 and 27 respectively against the face sides of screw ring 22. A circlip 32 forms an abutment for one end of spring 30. A coupling sleeve 33 is in engagement with ring 22 by means of a thread 34 on sleeve 33. A key groove 35 serves to couple sleeve 33 to the second component to be coupled, a similar key groove 41 being provided in coupling member 5.

Part of coupling sleeve 33 is radially enlarged and formed with notches 36 in which are fitted the inner friction discs 37. Sleeve 33 is further formed in its narrow part with notches 33' which are engaged by the ears of lock ring 27. A disc 38 abuts against a lug 39 radially extending from the enlarged part of sleeve 33. Disc 38 serves to transmit pressure generated in the magnetic part of the coupling upon the friction disc assembly.

Coupling disc 5 has an internal recess 40 to provide space for an axial displacement of coupling sleeve 33 and the associated parts.

As previously mentioned, screw ring 22 has on each of its two cylindrical surfaces a threading of which one is a right hand threading and the other a left hand threading and is in threaded engagement with ring sleeve 17 and coupling sleeve 33 which are provided with corresponding threads. A suitable bearing such as a needle bearing 42 is interposed between parts 1, 2, and sleeve 17. This affords the advantage that the coupling constitutes a very compact until which greatly facilitates its mounting and assemblage.

It is irrelevant whether the right hand threading or the left hand threading is the outer one on ring 22. It is only essential that two threadings of opposite hand are provided and that the inclination of the locking teeth on both sides of ring 22 is such that, depending upon the direction of rotation or force, either the right hand threading or the left hand threading is effective and that the other threading is locked against rotation in opposite direction as will become more fully apparent in connection with Figs. 5 to 10.

There are definite relations between the initial force—in this case the magnetic force—which is transmitted through the threaded members 17, 22, 33 to the friction disc assembly and the residual force which remains at the magnetic part of the coupling, both forces being represented by the pressure generated in the coupling. The entire moment irrespective by which means it is generated, hence distributes itself between the part in which it is generated and the friction assembly. The ratio of distribution depends upon the friction and transmission conditions in the pressure generating part of the coupling and also upon the pitch of the threads and the friction in the gear means involved. Hence, it may be advantageous to provide several frictional surfaces within the part generating the pressure, more specifically, between the pole surfaces of the magnet body and the armature as is shown in Fig. 2.

Figure 2:
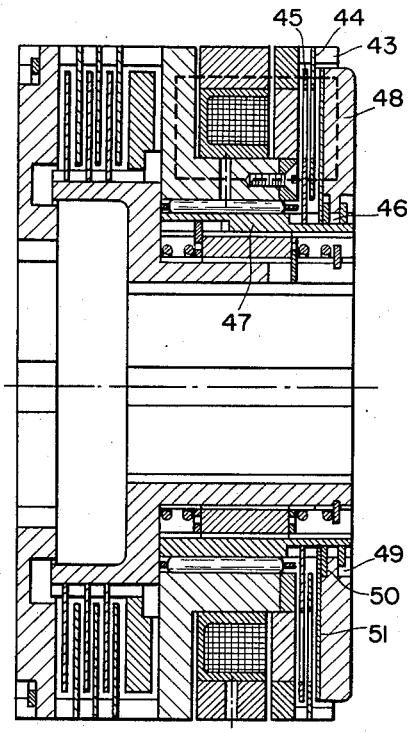
Fig. 2 is a sectional elevational view of a modification of the electromagnetically operated friction coupling according to Fig. 1.

The exemplification of the coupling according to the invention as shown in Fig. 2 is basically the same as that of Fig. 1 with the exception that the magnet body has carrier lugs 43 also on its side facing the armature 48, that is, on the side of the pole surfaces. Lugs 43 mount the outer friction discs 44. The inner friction discs 45 are seated in notches 46 of a gear sleeve 47.

In the event the armature has a comparatively heavy mass as is frequently the case in electromagnetic couplings, the control of the forces of inertia must be taken in consideration. The influence of the moments of force may be conveniently eliminated or at least rendered harmless by rotatably fitting armature 48 upon threaded sleeve 47 and securing the armature against axial displacement relative to sleeve 47 by circlips 49 and 50 whereby the armature can be displaced jointly with the sleeve only. A disc 51 is seated upon the threaded sleeve 47 so that armature 48 does no longer participate in the transmission of the peripheral force, but that this function is taken over by disc 51. Armature 48 can hence rotate on threaded sleeve 47 whereby the resetting means of the coupling formed by the aforedescribed screw and lock rings are relieved from the rotational moment of the armature.

Friction discs 44 and 45 may be made of any suitable ferromagnetic material and have preferably window-like openings in the zone of the exciting coil as is customary in electromagnetic couplings. Any suitable number of coacting friction discs may be provided.

The operation of the couplings according to Figs. 1 and 2 is as follows:

Let it be assumed that the respective exciting coil is energized. As a result, a magnetic field is generated, the path of which is indicated by dashed lines. Armature 16 of Fig. 1 or armature 48 of Fig. 2 is attracted and axially displaced through sleeve 17, ring 22 and sleeve 33 to produce the coupling pressure whereby in Fig. 1 only one frictional surface and in Fig. 2 several frictional surfaces become effective in the magnetic part of the coupling.

If now in the couplings the respective coacting frictional surfaces of the friction disc assembly 4, 37 and disc 38 are not yet in sufficiently tight frictional engagement, for instance, due to wear and tear experienced by the friction discs, the coupling will slip since a rotational moment acts through coupling sleeve 5 directly upon the magnet body 1, 2 and a moment of reaction acts upon coupling sleeve 33. Due to the magnetically generated pressure between the magnet poles and the armature of Fig. 1, or between the magnet poles, friction discs 44, 45 and armature 48 of Fig. 2 a peripheral force is produced by friction. As a result of this force threaded ring 22 and with it coupling sleeve 33 are displaced over ring sleeve 17 and its thread 18 in the direction toward friction discs 4, 37. Part of the magnetically generated coupling pressure is transmitted upon the disc assembly proper of the coupling provided that thread 34 between ring 22 and sleeve 33 is locked by means of the aforedescribed locking means in the aforesaid direction of rotation or force. Consequently, discs 4 and 37 are further pressed toward each other and the coupling can transmit its full moment of rotation. Let it now be assumed that the direction of rotation or force is reversed, then lock ring 27 is released and lock ring 20 becomes effective. As a result, threaded ring 22 can no longer rotate relative to ring sleeve 17 but relative to coupling sleeve 33. Since one of the threadings on ring 22 is left handed and the other is right handed and either the outer or the inner threading is locked against rotation, coupling sleeve 33 must be displaced always in the same direction, that is, in the direction toward the disc assembly. Consequently, any change in the initial total axial thickness of the disc assembly caused for instance by wear and tear on the friction discs is automatically compensated.

If now the exciting coil is deenergized the coupling is released due to the disappearance of the magnetic field supplying the coupling pressure, but remains in the setting which existed just before the release of the coupling. Whether coupling sleeve 33 is displaced in one or the other direction depends only upon the disposition of the threadings and the direction of slant of the locking teeth as is clearly shown in Figs. 5 to 10. Accordingly, the direction of displacement of sleeve 33 may be selected in accordance with the most favorable conditions of a specific application. It is only essential that the portion of the total magnetically generated coupling pressure which acts upon the disc assembly also acts as a reaction force tending to press the armature away from the magnet body, that is in the direction opposite to the direction of the magnetic force.

Figure 3:
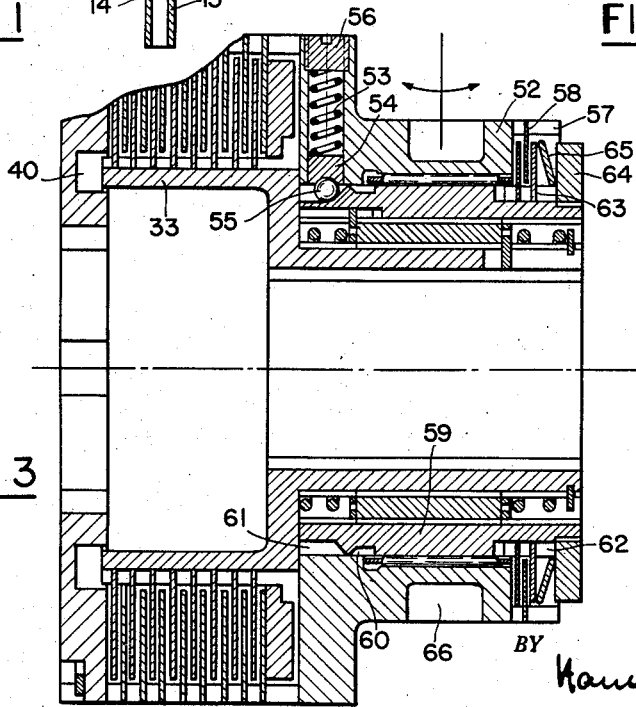
Fig. 3 is a sectional elevational view of a mechanical operated friction coupling according to the invention.
Figure 5:
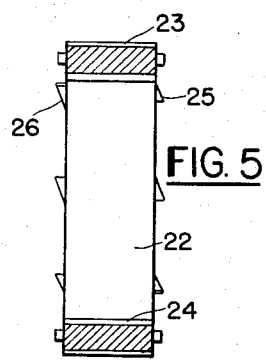
Fig. 5 is a sectional detail view of a component of the friction couplings shown in Figs. 1 through 4.

Fig. 3 shows a mechanically operated coupling also equipped with the automatic resetting means according to the invention. The principal difference between the embodiments of Figs. 1 and 2 and the embodiment of Fig. 3 resides in the generation of the coupling pressure. The magnetic part of the previously described figures is replaced by an axially slidable sleeve 52 with a flanged wall portion in which several circumferentially spaced bores are provided. Each of these bores houses a spring 53 which presses over an insert 54 upon a ball 55. The springs are retained in the respective bores by any suitable means such as threaded plugs 56. Sleeve 52 also mounts carrier lugs 57 in which are seated the outer friction discs 58. The pressure supplying part of the coupling further comprises a gear sleeve 59 formed with annular grooves 60 and 61 of different radial depth and a notched portion 62 in which the inner friction discs 63 are seated. An end disc 64 is fixedly secured to sleeve 59. To obtain a sufficiently elastic operation, it is advantageous to provide a dished spring 65 or to employ friction discs of sufficient elasticity.

Sleeve 52 is finally formed with an annular groove 66 in which may be fitted actuating means of suitable design which are not shown. The arrows indicate the two directions in which sleeve 52 may be axially displaced.

The threaded rings, the locking means and the friction disc assembly proper are the same as have been described in connection with Figs. 1 and 2.

The operation of the re-setting means is also the same as described in connection with Figs. 1 and 2 except that the coupling pressure is mechanically generated and transmitted through ring 22 and sleeve 33. The set of discs 58 and 63 is compressed by displacement of sleeve 52 and the resulting friction produces a peripheral force. The displacement of the sleeve moves balls 55 from groove 61 into the shallower groove 60, the balls climbing over the rib separating the two grooves. Due to the placement of balls 55 in groove 60 springs 53 are loaded whereby sleeve 52 is retained in its displaced position.

It is advantageous to select the characteristic of springs 53 so that the loading of the springs is at a minimum when the balls are in groove 61 which represents the idle or released position of the coupling, but rises steeply when the balls are lifted into groove 60. By selecting an appropriate shape of groove 60 and the rib separating the same from groove 61 substantial forces can be caused to act upon the disc assembly.

To release the coupling, sleeve 52 is returned into the illustrated initial or idle position.

Figure 4:
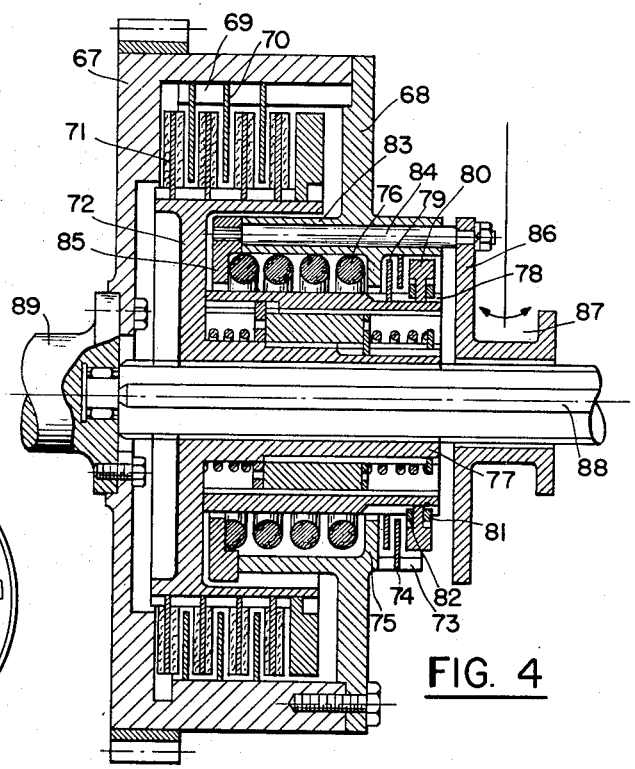
Fig. 4 is a sectional elevational view of a friction coupling according to the invention which is normally held in coupled position by the action of a spring.
Figure 6:
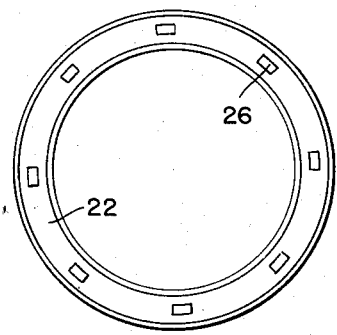
Fig. 6 is a plan view of one side of Fig. 5.
Figure 7:
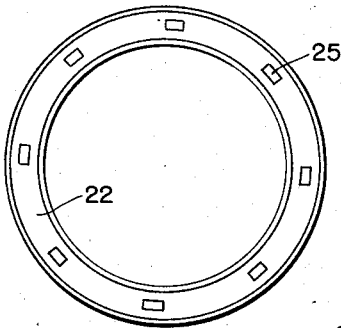
Fig. 7 is a plan view of the other side of Fig. 5.

Fig. 4 shows a coupling equipped with the re-setting means according to the invention which is held by spring pressure in its coupled position, but can be temporarily released by the application of an external force as will be hereinafter explained. Couplings of this kind are customarily used as vehicle clutches. The arrangement and the function of the threaded ring, the locking means and the friction disc assembly are basically the same as described in connection with Figs. 1 and 2. The coupling of Fig. 4 comprises a fly wheel 67 secured to a disc 68. The inner peripheral wall of wheel 67 is formed with several axially spaced notches 69 in which are fitted the outer friction discs 70. The inner friction discs 71 are seated in a ring member 72 which corresponds in function to member 33 of Fig. 1. Disc 68 has secured thereto or integral therewith lugs 73 in which are fitted friction discs 74. Disc 68 is further formed with an extension 75 which serves as an abutment for a main spring 76. The previously described re-setting means are mounted on a ring sleeve 77 which is formed with notches 78 for the inner friction discs 79 coacting with discs 74. A ring 80 is fitted upon ring sleeve 77 and secured against axial displacement by two circlips 81 and 82. Disc 68 has at its periphery several circumferentially spaced axially extending portions 83 in which bolts 84 are guided. These bolts are secured on one end to a ring disc 85 and on the other hand to a sleeve 86. The spring 76 which serves to produce the coupling pressure abuts with one end against extension 75 of disc 68 and with its other end against ring disc 85. Sleeve 86 is formed with an annular groove 87 which serves to receive suitable actuating means for releasing the coupling.

One of the coupling members to be coupled is mounted on a shaft 88 and the other on a shaft 89.

The operation of the re-setting means of the coupling according to Fig. 4 is basically the same as has been described in connection with Figs. 1 and 2, except that the coupling pressure is produced by spring 76 and is active unless temporarily released. The pressure of spring 76 acts upon friction elements 74 and 79 and disc ring 80 by displacing the same into frictional engagement whereby the resulting friction produces a peripheral force which transmits a portion of the coupling pressure produced by spring 76 through the previously described threaded members and ring member 72 upon the disc assembly 70, 71 constituting the friction assembly proper of the coupling.

To release the coupling, sleeve 86 is displaced in the direction in which the pressure of spring 76 holding parts 74, 79 and 80 in frictional engagement is temporarily nullified over bolts 84 and disc 85.

The friction discs used in the friction disc assembly of the couplings described herein may be made of any suitable material and may or may not be coated with a special friction material. The number, size and configuration of the friction discs may be freely selected. The friction discs employed in the part of the coupling which supplies the coupling pressure must be made of ferromagnetic material in electromagnetic couplings as described for instance in Figs. 1 and 2. In couplings in which the coupling pressure is produced by forces other than magnetic forces, the friction discs in the pressure supplying part of the coupling may be made of any suitable material. The size and configuration of the discs may be freely selected with mechanical couplings also.

The automatic resetting means for friction couplings according to the invention are not limited to the specific illustrated designs of friction couplings. They may be usefully employed in couplings of any kind irrespective whether the couplings are single or multiple disc couplings and irrespective of the means by which the coupling pressure is produced. The gear means and locking means may also take shapes and designs different from those here illustrated. It is only essential that a left hand and a right hand gearing is provided, one of which is locked against rotation in opposite direction depending upon the direction of rotation or force and which is coupled with means automatically moving the friction discs of the friction disc assembly proper into relative positions in which the required frictional pressure is produced when the coupling members are in engagement.

What is claimed, is:

1. A frictional coupling for releasably coupling a driving and a driven rotary component, said coupling comprising a friction disc assembly including two sets of coacting friction discs, a first rotary coupling member adapted to receive one of said components, one set of said discs being fixedly secured to said coupling member for rotation in unison therewith, a second rotary coupling member adapted to receive the other component, the other set of discs of said disc assembly being fixedly secured to the second coupling member for rotary and axial movement in unison therewith, said second coupling member being axially displaceable for movement of the two sets of the disc assembly into and out of frictional engagement, coupling pressure generating means, transmission means for transmitting the generated coupling pressure from said generating means to said second coupling member to displace the latter toward frictional engagement of the disc assembly, compensating means included in said transmission means for automatically adjusting the displacement of the second coupling member to the axial thickness of the disc assembly, said compensating means including a first coupling sleeve having on one of its peripheral walls a left hand thread and on the other a right hand thread, a second coupling sleeve disposed between the first sleeve and the pressure generating means, said threaded first sleeve being in movement transmitting engagement with corresponding threads on the second sleeve and the second coupling member, and coacting locking means between the first sleeve and the second sleeve and the second coupling member respectively, said locking means being actuated by the occurrence of a slippage of the coupling members relative to each other for positively and immediately locking the first sleeve to the second sleeve and the second coupling member respectively depending upon the rotational direction of a slippage of the second coupling member relative to the first coupling member whereby such slippage causes an axial displacement of the second coupling member always in the direction of a frictional engagement of the discs of the disc assembly when the pressure generating means is activated thus tightening the frictional grip between the discs.

2. A friction coupling according to claim 1, wherein said locking means comprise circumferentially spaced oppositely slanted locking teeth on opposite end sides of the first sleeve and two spring biased locking rings each engaging said locking teeth on one side of the first sleeve, one of the locking rings being coupled with the second sleeve and the other with the second coupling member in movement and force transmitting engagement for locking the first sleeve against rotation relative to the second sleeve and relative to the second coupling member respectively depending upon the rotational direction of the slippage of the friction means whereby the second coupling member is always displaced in the same axial direction relative to the disc assembly.

3. A friction coupling according to claim 1, wherein said pressure means comprise electromagnetic means including an energizable magnet body and an armature, said armature constituting the friction means, said friction means being included in the transmission means, the magnet body being directly coupled with said first coupling member and the respective set of discs and the armature being coupled with the second coupling member and the respective set of discs through said sleeves and locking means.

4. A friction coupling according to claim 3, wherein several coacting friction elements are interposed between said magnet body and said armature.

5. A friction coupling according to claim 1, wherein said pressure means comprise mechanically actuated pressure means including two parts movable relative to each other, one of said parts being directly coupled with the first coupling member and the respective set of discs and the other part being coupled with the second coupling member and the respective set of discs through said sleeves and locking means.

6. A friction coupling according to claim 5, wherein said pressure means are spring actuated.

7. A friction coupling according to claim 6, wherein said coupling members are normally held in engagement by said spring actuated pressure means, said pressure means being releasable by the application of an external force.

8. A friction coupling according to claim 1, wherein said pressure means comprise mechanically actuated pressure means including two parts movable relative to each other, one of said parts being directly coupled with the first coupling member and the respective set of discs and the other part being coupled with the second coupling member and the respective set of discs through said sleeves and locking means, and wherein several coacting friction elements are interposed between said other part of the pressure means and said transmission means.

9. A friction coupling according to claim 1, wherein said pressure means comprise electromagnetic means including an energizable magnet body and an armature, said armature being included in the transmission means and being seated upon the second sleeve rotatable but secured against axial displacement.

10. A friction coupling according to claim 1, wherein said pressure means are journalled upon said second sleeve and locking means coaxially therewith, and wherein said first coupling member comprises a coupling disc secured to said pressure means coaxially therewith.

References Cited in the file of this patent

UNITED STATES PATENTS

| | | |
|---|---|---|
| 2,692,035 | Rabinow | Oct. 19, 1954 |

FOREIGN PATENTS

| | | |
|---|---|---|
| 133,521 | Australia | July 18, 1949 |
| 1,083,931 | France | June 30, 1954 |